(12) United States Patent
Akoglu et al.

(10) Patent No.: US 8,903,824 B2
(45) Date of Patent: Dec. 2, 2014

(54) VERTEX-PROXIMITY QUERY PROCESSING

(75) Inventors: Leman Akoglu, Pittsburgh, PA (US);
Rohit M. Khandekar, Elmsford, NY (US); Vibhore Kumar, Hawthorne, NY (US); Srinivasan Parthasarathy, Yonkers, NY (US); Deepak Rajan, Fishkill, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/315,415

(22) Filed: Dec. 9, 2011

(65) Prior Publication Data

US 2013/0151536 A1 Jun. 13, 2013

(51) Int. Cl.
  *G06F 17/30* (2006.01)
(52) U.S. Cl.
  USPC .......................................... 707/737; 707/798
(58) Field of Classification Search
  USPC ................................................ 707/748, 736
  See application file for complete search history.

(56) References Cited

U.S. PATENT DOCUMENTS

| | | | | |
|---|---|---|---|---|
| 5,197,130 | A * | 3/1993 | Chen et al. | 712/3 |
| 7,885,269 | B2 | 2/2011 | Bayati et al. | |
| 7,941,387 | B2 * | 5/2011 | Amini et al. | 706/46 |
| 7,987,250 | B2 * | 7/2011 | Pai | 709/223 |
| 8,156,129 | B2 * | 4/2012 | Zhou et al. | 707/749 |
| 8,171,032 | B2 * | 5/2012 | Herz | 707/748 |
| 2002/0123987 | A1 | 9/2002 | Cox | |
| 2002/0167521 | A1 * | 11/2002 | Sasaki | 345/474 |
| 2006/0004811 | A1 * | 1/2006 | McSherry | 707/101 |
| 2006/0190225 | A1 * | 8/2006 | Brand | 703/2 |
| 2008/0222726 | A1 | 9/2008 | Chayes et al. | |
| 2008/0294584 | A1 * | 11/2008 | Herz | 706/46 |
| 2010/0095374 | A1 | 4/2010 | Gillum et al. | |
| 2010/0241828 | A1 * | 9/2010 | Yu et al. | 712/30 |
| 2010/0274785 | A1 * | 10/2010 | Procopiuc et al. | 707/737 |
| 2011/0060711 | A1 | 3/2011 | Macready et al. | |
| 2011/0078133 | A1 | 3/2011 | Bordawekar et al. | |
| 2011/0145261 | A1 * | 6/2011 | Jamjoom et al. | 707/748 |
| 2011/0161080 | A1 * | 6/2011 | Ballinger et al. | 704/235 |
| 2011/0194761 | A1 * | 8/2011 | Wang et al. | 382/165 |

OTHER PUBLICATIONS

Zzurang, Algorithms, Jan. 11, 2010, Intelligent Web Lab Path compresion in an unweighted directed graph.*
Zzurang, Algorithms, Jan. 11, 2010. Intelligent Web Lab Path compression in an unweighted directed graph.*
Strassen Algorithm, http://en.wikipedia.org/wiki/Strassen_algorithm, downloaded Nov. 27, 2012, pp. 1-8.
Jamie King, Conductance and Rapidly Mixing Markov Chains, Mar. 26, 2003, pp. 1-14.

(Continued)

*Primary Examiner* — Sherief Badawi
*Assistant Examiner* — Courtney Harmon
(74) *Attorney, Agent, or Firm* — Ryan, Mason & Lewis, LLP

(57) ABSTRACT

A method, an apparatus and an article of manufacture for processing a random-walk based vertex-proximity query on a graph. The method includes computing at least one vertex cluster and corresponding meta-information from a graph, dynamically updating the clustering and corresponding meta-information upon modification of the graph, and identifying a vertex cluster relevant to at least one query vertex and aggregating corresponding meta-information of the cluster to process the query.

20 Claims, 3 Drawing Sheets

(56) References Cited

OTHER PUBLICATIONS

Page et al. The Pagerank Citation Ranking: Bringing Order to the Web, Technical Report 1999-66, Stanford InfoLab, Nov. 1999.

Woodbury Matrix Identity, http://en.wikipedia.org/wiki/Woodbury_matrix_identity, downloaded Nov. 27, 2012, pp. 1-4.

Karypis et al., CHAMELEON: A Hierarchical Clustering Algorithm Using Dynamic Modeling, IEEE Computer, vol. 32 #8, Aug. 1999, pp. 1-22.

Clarkson, Nearest-Neighbor Searching and Metric Space Dimensions, in Nearest-Neighbor Methods for Learning and Vision: Theory and Practice. MIT Press, 2005, pp. 1-45.

Krauthgamer et al., Navigating Nets: Simple Algorithms for Proximity Search, Proceedings of the Fifteen Annual ACM-SIAM Symposium on Discrete Algorithms, 2004, pp. 1-10.

Shamir et al. Cluster Graph Modification Problems, Discrete Applied Mathematics 144 (2004) 173-182, Elsevier.

Galil et al. Fully Dynamic Algorithms for Edge Connectivity Problems, in Proceedings of STOC, 1991, 317-327.

D. Fogaras et al., Towards Scaling Fully Personalized Pagerank: Algorithms, Lower Bounds, and Experiments, in Internet Mathematics, vol. 2, No. 3:333-358 2004.

Tong et al., Fast Random Walk with Restart and its Applications, in ICDM 2006, pp. 1-10.

Chakrabarti et al., Dynamic Personalized Pagerank in Entity-Relation Graphs, in WWW 2007, May 8-12, 2007, pp. 571-580.

Tong et al., Proximity Tracking on Time-Evolving Bipartite Graphs, in SDM 2008, pp. 704-715.

Sarkar et al., Fast Nearest-Neighbor Search in Disk-Resident Graphs in KDD 2010, pp. 1-22.

Andersen et al., Local Graph Partitioning Using Pagerank Vectors, in Proc. 47th Annual IEEE Symposium on Foundations of Computer Science, pp. 475-486, 2006, pp. 1-22.

Avrachenkov et al., Monte Carlo Methods in Pagerank Computation: When one Iteration is Sufficient, SIAM J. Numer. Anal., 45(2):890-904, 2007, pp. 1-20.

Chen et al., Local Methods for Estimating Pagerank Values, in CIKM '04: Proceedings of the Thirteenth ACM International Conference on Information and Knowledge Management, pp. 381-389, New York, NY, USA, 2004. ACM.

Sarma et al., Estimating Pagerank on Graph Streams, in PODS '08: Proceedings on the twenty-seventh ACM SIGMOD-SIGACT-SIGART Symposium on Principles of Database Systems, pp. 69-78, New York, NY, USA, 2008. ACM.

Gupta et al., Fast Algorithms for Top Personalized Pagerank Queries, in WWW '08: Proceeding of the 17th International Conference on World Wide Web, pp. 1225-1226, New York, NY, USA, 2008. ACM.

Haveliwala, Topic-Sensitive Pagerank: A Context-Sensitive Ranking Algorithm for Web Search, Technical Report 2003-29, Stanford InfoLab, 2003. Extended Version of the WWW2002 paper on Topic-Sensitive PageRank, IEEE Transactions on Knowledge and Data Engineering, vol. 15, No. 4, Jul./Aug. 2003, pp. 784-796.

Jeh et al., Scaling Personalized Web Search, Technical Report 2002-12, Stanford InfoLab, 2002, pp. 1-35.

Kamvar et al., Adaptive Methods for the Computation of Pagerank, Technical Report 2003-26, Stanford InfoLab, Apr. 2003, Numerical Solution of Markov Chains, pp. 31-44.

Kamvar et al., Exploiting the Block Structure of the Web for Computing Pagerank, Technical Report 2003-17, Stanford InfoLab, 2003, pp. 1-13.

Langville et al., Updating Pagerank with Iterative Aggregation, in WWW Alt. '04: Proceedings of the 13th International World Wide Web Conference on Alternate Track Papers & Posters, pp. 392-393, New York, NY, USA, 2004. ACM.

Leskovec et al., Community Structure in Large Networks: Natural Cluster Sizes and the Absence of Large Well-Defined Clusters, CoRR, abs/0810.1355, 2008, pp. 1-66.

McSherry, A Uniform Approach to Accelerated Pagerank Computation, in WWW '05: Proceedings of the 14th International Conference on World Wide Web, pp. 575-582, New York, NY, USA, 2005. ACM.

Pathak et al., Index Design for Dynamic Personalized Pagerank, in ICDE, pp. 1489-1491, 2008.

Sarlos et al., To Randomize or Not to Randomize: Space Optimal Summaries for Hyperlink Analysis, in WWW '06: Proceedings of the 15th International Conference on World Wide Web, pp. 297-306, New York, NY, USA, 2006. ACM.

Schaeffer, Graph Clustering, Computer Science Review, 1:27-64, 2007.

\* cited by examiner

US 8,903,824 B2

VERTEX-PROXIMITY QUERY PROCESSING

FIELD OF THE INVENTION

Embodiments of the invention generally relate to information technology, and, more particularly, to data management.

BACKGROUND OF THE INVENTION

Quantifying the proximity, relevance and/or similarity between two vertices, and more generally, finding the k nearest neighbors (k-nns) of a given vertex in a large, time-evolving graph, is a fundamental building block for many applications. For example, in social networking graphs where the vertices are users and the edges represent connections between them, it may be desirable to recognize "nearby" but currently unconnected users, and recommend them to a particular user. In customer-product graphs, it may be desirable to recommend products to a customer based on a profile such as purchases and search history of "nearby" customers.

Existing approaches suffer from drawbacks such as, for example, not being scalable because they assume that the entire graph resides in the memory. Some existing approaches only work on static graphs, and other approaches work only on special types of time-varying graphs.

SUMMARY OF THE INVENTION

In one aspect of the present invention, techniques for vertex-proximity query processing are provided. An exemplary computer-implemented method for processing a random-walk based vertex-proximity query on a graph can include steps of computing at least one vertex cluster and corresponding meta-information from a graph, dynamically updating the clustering and corresponding meta-information upon modification of the graph, and identifying a vertex cluster relevant to at least one query vertex and aggregating corresponding meta-information of the cluster to process the query.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
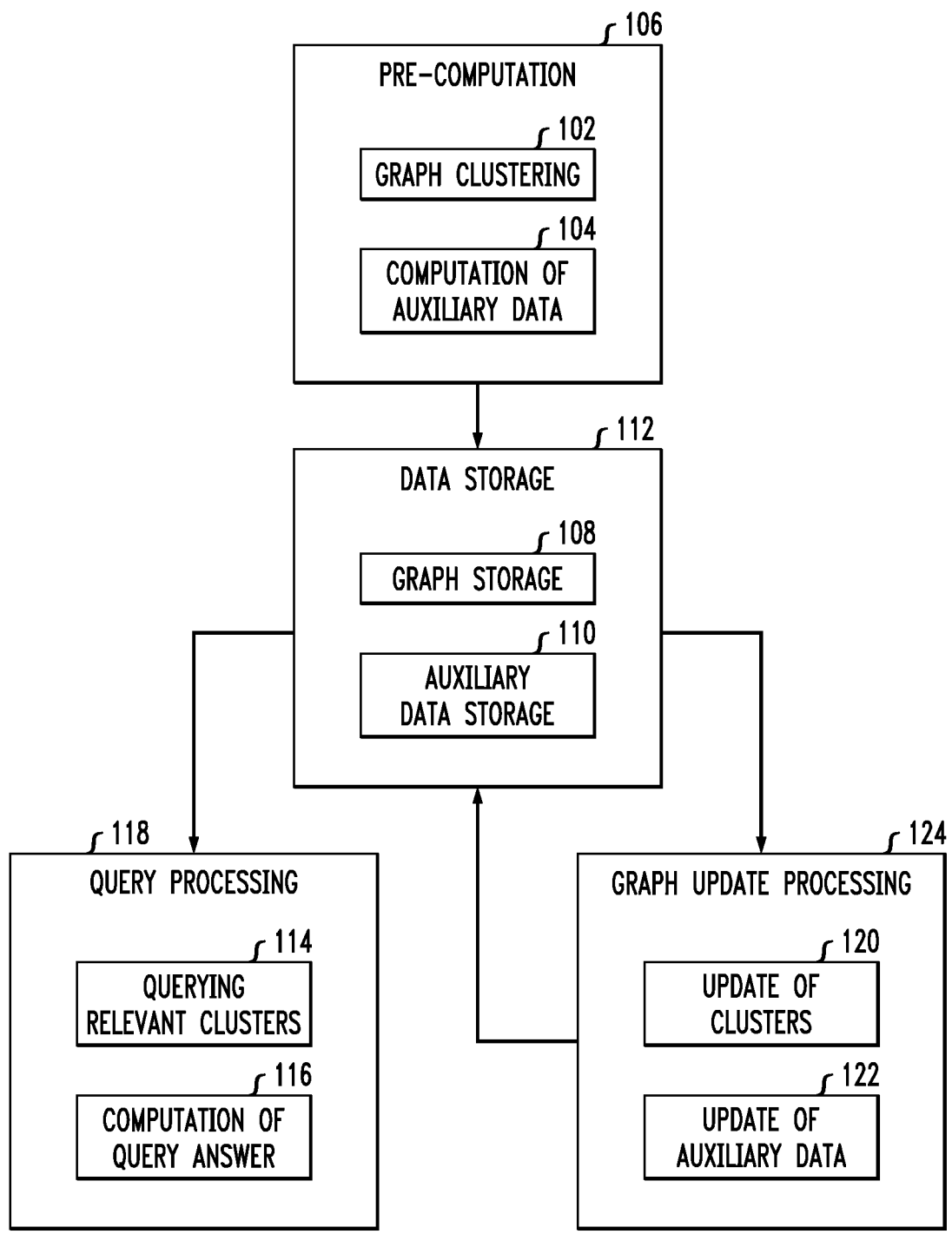
FIG. 1 is a block diagram illustrating an example embodiment, according to an aspect of the invention.

As described herein, an aspect of the present invention includes vertex-proximity query processing in large time-evolving graphs. The techniques detailed herein include managing large-scale time-evolving graph data and nearest neighbor query processing in graphs. An aspect of the invention includes using an algorithm referred to herein as ClusterRank to answer vertex-proximity queries on graphs. Example embodiments of the invention work with large, disk-resident and distributed graphs that may not fit in memory.

Additionally, as described herein, embodiments of the invention include a sub-linear query response time, wherein only a small and relevant portion of the graph is loaded into main memory. Further, an example embodiment of the invention includes fast, incremental update procedures for handling additions/deletions of edges/vertices for time-evolving graphs.

As detailed herein, a Personalized Page Rank (PPR) score is defined as a stationary distribution of a random walk from a query vertex q. In an aspect of the invention, a graph is divided into clusters that are likely to contain the random walk for a duration of time, and information related to random walks inside the clusters is pre-computed. At query time, we identify clusters close to q are identified and the random walk distribution on the "top-level" graph on these clusters is computed.

PPR scores facilitate finding nearest neighbors of a given node in a node graph. However, efficient PPR scores are challenging when the node graph is large and time-evolving. Accordingly, as detailed herein, ClusterRank represents the graph as a collection of low-conductance clusters with interconnections. Meta-information related to internal random walks is stored and updated for each cluster. At query time, the meta-information from a smaller subset of clusters relevant to the query is aggregated to computer the PPR score efficiently.

Although PPR scores are used as a measure of vertex-proximity in an example embodiment of the invention, one skilled in art can extend the techniques described herein to other random-walk based proximity measures including but not limited to hitting time and commute time.

As described herein, ClusterRank has three components: a pre-processing phase, a dynamic update phase and a query processing phase. The pre-processing phase inputs a static graph and computes a low-conductance clustering of the vertices using a PageRankNibble algorithm. These possibly overlapping clusters can be computed in parallel on one or more compute nodes and then are stored on one or more storage devices. This phase then processes each cluster in parallel and independently of other clusters and pre-computes certain intra-cluster random walk meta-information. This meta-information can also be stored on one or more storage devices.

The dynamic update phase is used when graph changes due to edge or vertex additions or deletions. To incorporate this change, this phase updates the clustering if needed and the meta-information associated with relevant clusters. It does not update the non-relevant clusters and their meta-information. The query processing phase is used to answer nearest neighbor queries. Given a set of one or more query vertices, this phase identifies the relevant clusters containing the query vertices and computes PPR scores by aggregating the meta-information associated with the relevant clusters.

In contrast to existing approaches, embodiments of the present invention include breaking down a large graph into relatively small manageable clusters which can be stored and processed on one or more computes nodes in a distributed manner. Also, an aspect of the invention includes updating the clusters and their meta-information upon vertex and edge additions and deletions, as well as putting together the pre-computed meta-information to answer nearest neighbor queries efficiently. Because the query processing phase handles only a relatively small number of relevant clusters, the query response time is largely independent of the entire graph size, making the techniques detailed herein scalable.

ClusterRank represents a given graph as a collection of overlapping low-conductance vertex-clusters with their inter connections. Each vertex-cluster maintains certain characteristics related to internal random walks and updates this information as the graph changes. At query time, ClusterRank combines this information from a small set of relevant clusters and computes PPR scores efficiently. While ClusterRank can perform exact computations, at least one embodiment of the invention also includes several heuristics to reduce its query response time while only sacrificing a minimum amount of accuracy.

In example embodiments of the invention, both the pre-processing and query-processing phases can be performed when a graph resides entirely on disk. Moreover, as noted, only a small and relevant portion of the graph is loaded into main memory in order to answer a query. By way of example, the techniques detailed herein can be implemented with respect to graphs with up to 20 million edges.

In accordance with an embodiment of the invention, a graph is clustered into relatively small vertex clusters and the overall problem can be decomposed into simulating several intra-cluster and inter-cluster random walks. For a subset S of vertices, conditioned on the event that the random walk is in S, the probability that it steps out of S is proportional to its conductance—the ratio of the weight of edges crossing S to the weight of all edges incident to vertices in S. Thus, a low-conductance cluster "holds" the random walk longer than a high-conductance cluster. This makes low conductance a natural choice for estimating quality of a cluster. Low conductance clusters also tend to have relatively small number of vertices on the boundary.

The graph is decomposed into several low-conductance vertex clusters $S_1, \ldots, S_p$. Because for each cluster $S_i$, a relatively small fraction of edges incident to $S_i$ leave $S_i$, these clusters in fact capture the "neighborhood" or "community structure" in the graph. These clusters are allowed to overlap because it is natural for a vertex to belong to multiple communities.

By way of example, consider a random walk with restart starting at q. Let the sequence of vertices the walk visits be $v_0, v_1, v_2, \ldots$. A vertex may appear several times in this sequence. The stationary distribution of this walk is the relative frequency with which different vertices appear in this walk. Now suppose $q \in S_i$. As the random walk steps through this sequence, it stays in cluster $S_i$ for a while, and then jumps to another cluster $S_j$. Next, it stays in $S_j$ for while before jumping to yet another cluster, and so on. The clusters thus visited by the walk may also repeat. Accordingly, one can partition the walk into a sequence of contiguous blocks of vertices where each block represents a portion of the walk inside a cluster and consecutive blocks represent a jump from a cluster to another.

In describing how to simulate the random walk based on the clusters, for each cluster $S_i$ and each "entry" vertex $v \in S_i$, one can compute the characteristics of the random walk inside $S_i$ assuming it entered $S_i$ through v. These characteristics include the probabilities with which it exits $S_i$ to different "exit" vertices and the expected number of times it visits various vertices in $S_i$ before exiting. Also, this information can be computed for each cluster $S_i$ independent of other clusters. An aspect of the invention pre-computes and stores this information for each cluster.

At query time, an aspect of the invention combines this information across different clusters to compute the desired PPR scores. Whenever the graph changes due to addition/deletion of vertices/edges, the relevant clusters and their information are updated appropriately. Accordingly, as detailed herein, an example embodiment of the invention includes three main components: a pre-computation component, a query processing component and a graph update processing component.

The pre-computation component or phase includes clustering the graph into low-conductance, possibly overlapping clusters. For each vertex v, a unique cluster containing v is identified and referred to as the parent of v. These clusters are stored on one or more compute nodes. For each cluster, auxiliary information relating to intra-cluster random walks is computed and stored, independently of other clusters.

The query processing component or phase includes, given a query vertex, identifying the "correct" subset of clusters to consider. (If all the clusters are considered, then the final answer is exact.) Additionally, the auxiliary information of identified clusters is combined to compute PPR scores.

The graph update processing component or phase includes, given an update (addition/deletion of one or more vertices/edges), identifying the "correct" subset of clusters to update. The identified clusters and their auxiliary information are then updated.

Accordingly, as further detailed herein, given a large edge-weighted graph G, a query vertex q in G and an integer k, an embodiment of the invention can identify k vertices that have the highest PPR scores with respect to q in G. Also, given a large edge-weighted graph G(t) at time t, a subset D(t) of existing edges in G(t) and a set A(t) of new edges, an embodiment of the invention can update the graph structure to delete the edges in D(t) and add the edges in A(t); that is, compute $G(t+1):=(G(t)\backslash D(t))\cup A(t)$.

By way of example, the following illustrative descriptions assume that the graph is unweighted. It is to be appreciated, however, that the techniques detailed herein can be generalized to graphs with non-negative edge-weights.

Accordingly, with respect to pre-computation, in order to handle a large undirected graph G=(V, E) that may possibly not fit in a main memory, the vertices are clustered into clusters of relatively small size. One metric used to quantify cluster quality is conductance defined as follows. For a subset S of vertices, let $VOL(S)=\Sigma_{v \in S} d_v$ where $d_v$ denotes the degree of vertex v and let $\partial(S)$ denote the set of edges with exactly one end-point in S. The conductance of a cluster S is defined as $$\phi(S) = \frac{|\partial(S)|}{\min\{VOL(S), VOL(\overline{S})\}} \in [0, 1],$$

where $\bar{S}=V\backslash S$. If a cluster has no out-going edges, that is, if it is disconnected from rest of the graph, its conductance is 0. On the other hand, if a cluster does not have any internal edges, its conductance is 1.

Given a seed vertex, it is optimized to compute a low-conductance cluster containing the seed vertex. One can also find a cluster with the number of vertices at most a given upper bound. When used repeatedly, the technique naturally gives overlapping clusters, and can also be used when the graph resides on a disk. Also, this is a so-called local algorithm; that is, time taken to find a cluster of volume s in a graph on n vertices is $O(s \log^3 n)$; that is, it depends linearly on the cluster-size but only poly-logarithmically on the size of the entire graph. Accordingly, this algorithm can be used repeatedly while still paying linearly in the total size of the clusters found.

In an example embodiment of the invention, the clusters are computed one by one. A parameter a is fixed as an upper bound on the size of an identified cluster. Each time, a vertex that is not already included in the existing clusters is selected as a seed vertex and a cluster S containing this vertex and that has at most σ vertices is computed. This cluster can be expanded if needed as follows. All vertices $v \notin S$ with degree one whose neighbor is in S are identified and included in S. This not only covers such vertices but also does not increase the conductance of the cluster. If this cluster overlaps with the existing clusters significantly, this cluster is disregarded and the process repeated. By way of example, an overlap threshold $0<\eta<1$ can be fixed and the new cluster disregarded if at least η fraction of the vertices in the new cluster belong to the union of existing clusters. Otherwise, the new cluster is added to the set of existing clusters.

This is repeated until a pre-determined number of clusters are computed or a pre-determined fraction of all the vertices belong to the computed clusters. Ultimately, a cluster of vertices not belonging to the union of existing clusters is formed. Also, each vertex v is assigned to a unique cluster S containing v that also contains the maximum number of neighbors of v, with ties broken arbitrarily. As noted herein, such a cluster is referred to as the parent cluster of v. The notion of parent clusters is used while query processing.

In one or more embodiments of the invention, a given graph G can be residing across multiple nodes and thus can be naturally clustered. For example, the Web graph, with vertices being Web pages and edges being the links among them, can reside across many servers and is thus already clustered. In such cases, the clustering stage can be minimal or totally skipped.

In computing auxiliary information for clusters, let $S=\{S_1, S_2, \ldots, S_p\}$ denote the overlapping clustering computed. Certain auxiliary information is computed for each cluster $S_i \in S$, independently of others clusters. Assume, by way of illustration, that the query vertex $q \notin S_i$ and assume that the random walk with restart enters $S_i$ through a vertex $u \in S_i$. This random walk with restart can be simulated until it exits cluster $S_i$.

Suppose the random walk is at vertex $v \in S_i$. In one step, with probability $1-\alpha$, the random walk restarts at q and hence exits $S_i$. With probability a, it picks a neighbor $w \in r(v)$ at random. Here r(v) denotes the set of neighbors of v in G. If w $\in S_i$, the random walk continues within $S_i$. If $w \notin S_i$, the random walk exits $S_i$ to vertex w. The auxiliary information stored for each cluster $S_i$ includes two matrices, the count matrix and the exit matrix.

The count matrix $C_i$ is a $|S_i| \times |S_i|$ matrix defined as follows. The entry $C_i(u, v)$, for u, $v \in S_i$, equals the expected number of times a random walk with restart (restarting at $q \notin S_i$) starting at u visits v before exiting $S_i$.

With respect to the exit matrix, let $B_i=r(S)\backslash S_i$ denote the set of vertices not in $S_i$ that are adjacent to vertices in $S_i$. The exit matrix $E_i$ is a $|S_i| \times (|B_i|+1)$ matrix defined as follows. The entry $E_i(u, b)$, for $u \in S_i$ and $b \in B_i$, is the probability that a random walk with restart (restarting at $q \notin S_i$) starting at u exits $S_i$ while jumping to vertex $b \in B_i$. Because the random walk can exit $S_i$ while jumping to a restart vertex q (assumed not to be in $S_i$), there is an additional column in $E_i$ corresponding to q. Of course, the identity of the restart vertex q at the pre-computation phase is not known. Therefore q is treated as a symbolic representative of the restart vertex. The entry $E_i(u, q)$, for $u \in S_i$, is the probability that the random walk exits $S_i$ while jumping to the restart vertex q.

There are multiple ways in which one can compute matrices $C_i$ and $E_i$ for a cluster. For instance, one can directly use the closed-form expressions. In this case, computing auxiliary information for a cluster $S_i$ containing s vertices and containing b vertices in the neighborhood $r(S_i)\backslash S_i$ involves computing an inverse $(I-\alpha T_i)^{-1}$ of an s×s matrix and multiplying an s×s matrix and an s×(b+1) matrix. This takes a total of $O(s^3+s^2b)$ time using Gaussian elimination for inverting and textbook matrix products. One can reduce this time complexity by using the Strassen algorithm. An alternative is to use relations to compute these matrices in an iterative fashion.

In query processing, updating the matrices given a query vertex can include the following. Given a query vertex q, its unique parent cluster $S_i$ is identified. The count matrix $C_i$ and the exit matrix $E_i$ are then updated to reflect the fact that the restart vertex now lies inside the cluster $S_i$. The count and exit matrices corresponding to any other cluster, for example, $S_j$ with $j \neq i$, containing the query vertex are not updated. Also, assume that the random walk inside such a cluster $S_j$ exits the cluster when it restarts to q.

Given a query vertex q and its parent cluster $S_i$, the count matrix $C_i^q$ is a $|S_i| \times |S_i|$ matrix defined analogously. The entry $C_i^q(u, v)$, for u, $v \in S_i$, equals the expected number of times a random walk with restart (restarting at $q \in S_i$) starting at u visits v before exiting $S_i$.

Given a query vertex $q \in S_i$, the exit matrix $E_i^q$ is a $|S_i| \times |B_i|$ matrix defined analogously. The entry $E_i^q(u, b)$, for $u \in S_i$ and $b \in B_i$, is the probability that a random walk with restart (restarting at $q \in S_i$) starting at u exits $S_i$ while jumping to vertex $b \in B_i$. Note that because the random walk does not exit $S_i$ due to a restart, $E_i^q$ has only $|B_i|$ columns.

The expressions for $C_i$ and $C_i^q$ are similar—$C_i$ is the inverse of a matrix and $C_i^q$ is the inverse of the same matrix with $(1-\alpha)Q_q$ subtracted. Note also that $(1-\alpha)Q_q$ is a rank-1 matrix. A well-known identity can be used to update the inverse of a matrix efficiently when the matrix undergoes a low-rank update.

Let n and k be any positive integers. Let $A \in R^{n \times n}$, $U \in R^{n \times k}$, $\Sigma \in R^{k \times k}$, $V \in R^{k \times n}$ be any matrices. Accordingly, $$(A+U\Sigma V)^{-1}=A^{-1}-A^{-1}U(\Sigma^{-1}+VA^{-1}U)^{-1}VA^{-1}.$$

Note that U Σ V is a rank-k matrix. Thus, after updating A with a rank-k matrix, its inverse can be computed from $A^{-1}$ by doing 4 multiplications of n×n and n×k matrices, 2 multiplications of n×k and k×k matrices and 1 inverse of a k×k matrix. Thus, overall time is $O(n^2k)$ since k≤n. This can be much more efficient than computing the inverse of an n×n matrix from scratch, especially if k is much smaller than n. If k=1, the above formula reduces to what is commonly known as Sherman-Morrison formula.

To use this approach, express the rank-1 matrix $(1-\alpha)Q_q$ as U Σ V where Σ is a 1×1 matrix, that is, a scalar. This can be done by setting $\Sigma=(1-\alpha)\sqrt{|S_i|}$, U to be an $|S_i|$-size column vector with all entries 1ip and V to be an $|S_i|$-size row vector with all entries 0 except the entry corresponding to q equal to 1. Thus, $C_i^q$ can be computed from $C_i$ in $O(|S_i|^2)$ time. Similarly, $E_i^q$ can be computed from $C_i$ and $E_i$ in $O(|S_i|^2+|S_i||B_i|)$ time.

To simplify the notation in the following discussion, let $\hat{C}_i$ (resp. $\hat{E}_i$) denote $C_i^q$ (resp. $E_i^q$) if $S_i$ is the parent cluster of q, and $C_i$ (resp. $E_i$) otherwise.

As detailed herein, to compute the PPR scores, an aspect of the invention includes decomposing the random walk with restart starting from the query vertex q into intra-cluster and inter-cluster random walks. Because the information about intra-cluster random walks is already pre-computed (or appropriately updated for the parent cluster of the query vertex), the necessary information about the inter-cluster random walk can be computed. Accordingly, the clusters relevant for answering the k-nn query for q are identified. If PPR scores are to be computed exactly, all of the clusters are labeled as relevant. Working with all of the clusters to answer a query, however, can lead to increased query response time. As such, one can reduce the query response time significantly by limiting the number of relevant clusters.

An example embodiment of the invention includes employing two heuristics referred to as 1-hop and 2-hop to limit the relevant clusters. In the 1-hop heuristic, a cluster S is labeled as relevant if and only if $q \in S$. In the 2-hop heuristic, a cluster S is labeled as relevant if and only if either $q \in S$ or S is the parent cluster of some vertex $b \in B_i = r(S_i) \setminus S_i$ for some cluster $S_i$ such that $q \in S_i$. Intuitively, because the clustering represents the community structure in the graph, that is, the vertices well-connected to each other are expected to belong to a single cluster, the heuristics are able to quickly identify the vertices that are expected to have high PPR scores with respect to q.

Suppose $S_q$ is the set of relevant clusters. Let $\cup S_q$ denote the union of these clusters. Recall that $B_i = r(S_i) \setminus S_i$ denotes the set of vertices which the random walk inside $S_i$ may jump to while exiting $S_i$. Also, let $B_q = ((\cup S_q) \cap (\cup_{S_i \in S_q} B_i)) \cup \{q\}$ denote the set of such vertices of the identified clusters that are present in the identified clusters. The smaller the $|B_q|$, the better it is. Therefore, at least one embodiment of the invention explicitly tries to limit $|B_q|$ by further limiting the number of relevant clusters. More precisely, an embodiment of the invention can fix a parameter $\beta$ as an upper bound for the number of vertices allowed in $B_q$. While using either 1-hop or 2-hop heuristic, the clusters can be labeled one by one, and the size of $B_q$ can be kept track of. This can continue as long as $|B_q|$ does not exceed $\beta$ or all of the clusters according to the heuristic are labeled relevant.

After identifying the relevant clusters $S_q$, an aspect of the invention includes gathering auxiliary information of the clusters to compute the inter-cluster random walk matrix. Recall that when the random walk with restart enters $u \in S_i \in S_q$, it exits $S_i$ while jumping to some vertex $b \in B_i \{q\}$ (or $b \in B_i$ if $S_i$ is the parent cluster of q). Recall also that the probability of this event is given by $\hat{E}_i(u, b)$. This vertex b can belong to multiple clusters. When the random walk jumps to b, assume that it enters the parent cluster of b. Thus, one can think of inter-cluster jumps as a random walk on the vertices in $B_q$. Whenever the random walk jumps to a vertex $b \in B_i \setminus \cup S_q$ that is not in the relevant clusters, it is assumed that the random walk jumps back to q. The transition matrix (of dimensions $|B_q| \times |B_q|$) of this walk is as follows. For any $b_1, b_2 \in B_q$, the probability that this random walk jumps from $b_1$ to $b_2$ is given by $$m_q(b_1, b_2) = \begin{cases} \hat{E}_i(b_1, b_2), & \text{if } b_2 \neq q, S_i \text{ is the parent cluster of } b_1; \\ 1 - \sum_{b \in B_q/\{q\}} M_q(b_1, b_2), & \text{if } b_2 = q. \end{cases}$$

$M_q$ is computed from the auxiliary information stored (or appropriately updated) for the relevant clusters. Recall that the random walk (or the corresponding Markov chain) is called ergodic if it is possible to go from every state to every state (not necessarily in one move). Accordingly, it can be assumed that the given graph G is connected without loss of generality. Thus, if all clusters are labeled as relevant, the resulting Markov chain $M_q$ is clearly ergodic. Also, from the definition of 1-hop or 2-hop heuristics, the resulting Markov chain $M_q$ is still ergodic even if these heuristics are used.

From the standard theorem of ergodic chains, it can be concluded that there is a unique probability row-vector $\mu \in R^{|B_q|}$ such that $\mu M_q = \mu$. This vector gives the expected fraction of steps the random walk spends at any vertex $b \in B_q$. This vector can be computed either by doing repeated multiplications of $M_q$ with the starting probability distribution (which is 1 at the coordinate q and 0 elsewhere), or by computing the top eigenvector of $I - M_q^T$ corresponding to eigenvalue 1. The eigenvector computation can be done in time $O(|B_q|^3)$.

Additionally, an example embodiment of the invention can include lifting this random walk back to the random walk with restart on the union of the relevant clusters $\cup S_q$. Because a cluster $S_i \in S_q$, the value $\hat{C}_i(u, v)$ gives the expected number of times the random walk with restart (starting at q) visits $v \in S_i$ before exiting $S_i$. Therefore, for a vertex $v \in \cup S_q$, the quantity $$\prod_v = \sum_{S_i \in S_q: v \in S_i} \sum_{b \in B_q: S_i \text{ parent of } v} \mu_b \hat{C}_i(b, v)$$

gives the expected number of times the random walk with restart visits $v \in \cup S_q$ between consecutive inter-cluster jumps. Scaling these values so that they sum up to 1 gives the fraction of steps the random walk visits $v \in \cup S_q$, that is, $$\hat{\prod}_v = \frac{\prod_v}{\sum_{u \in \cup S_q} \prod_u}.$$

From the above description and the definition of PPR values, the following becomes evident. If all of the clusters are labeled as relevant, the computed values $\{\hat{\Pi}_v | v \in G\}$ equal the exact PPR values with respect to the query vertex q. The k-nn query can be answered by identifying k vertices with the highest values of $\hat{\Pi}_v$.

An aspect of the invention also includes dynamic updates. Accordingly, the graph representation—the clusters and their auxiliary information—can be updated when new edges are added or existing edges are deleted. Because additions and deletions are analogously handled, only edge additions are described herein for illustrative purposes. Furthermore, to simplify the presentation, the description herein pertains to handling an addition of a single edge $e = \{u, v\}$.

When an edge is added, the transition probability matrices $T_i$ and $T_i^+$ for some clusters $S_i$ are changed, resulting in a change of $C_i$ and $E_i$. An observation here is that the changes in $T_i$ and $T_i^+$ are low-rank. Therefore, new values of $C_i$ and $E_i$ can be computed from their old values as detailed herein. When an edge e={u, v} is submitted for addition, the set of clusters S(u) containing u and the set of clusters S(v) containing v are identified.

FIG. 1 is a block diagram illustrating an example embodiment, according to an aspect of the invention. By way of illustration, pre-computation module 106 takes the initial graph as input and sends it to graph clustering module 102. Module 102 clusters the vertices in the graph into at least one vertex-cluster. These vertex-clusters may or may not be overlapping. Module 104 computes the auxiliary data for each individual cluster. This auxiliary data captures the behavior of the random walk with restart inside each individual cluster. Module 104 sends the data to data storage module 112. Module 112 is responsible for storing the graph data and auxiliary data, wherein Module 108 stores the graph and Module 110 stores the auxiliary data.

Query processing module 118 is responsible for receiving the queries, processing them, and outputting the answers. Module 114 identifies the clusters relevant for each query and communicates with Module 118 to gather relevant auxiliary data related to these clusters. Module 116 then combines this data and computes the answer to each query. Additionally, graph update processing module 124 is responsible for receiving the graph updates and incorporating them. These graph updates can be, for example, additions or deletions of one or more vertices or edges. Module 120 updates the clusters and Module 122 updates the auxiliary data. These updates are communicated to Module 112 so that they are correctly reflected in the data storage.

Figure 2:
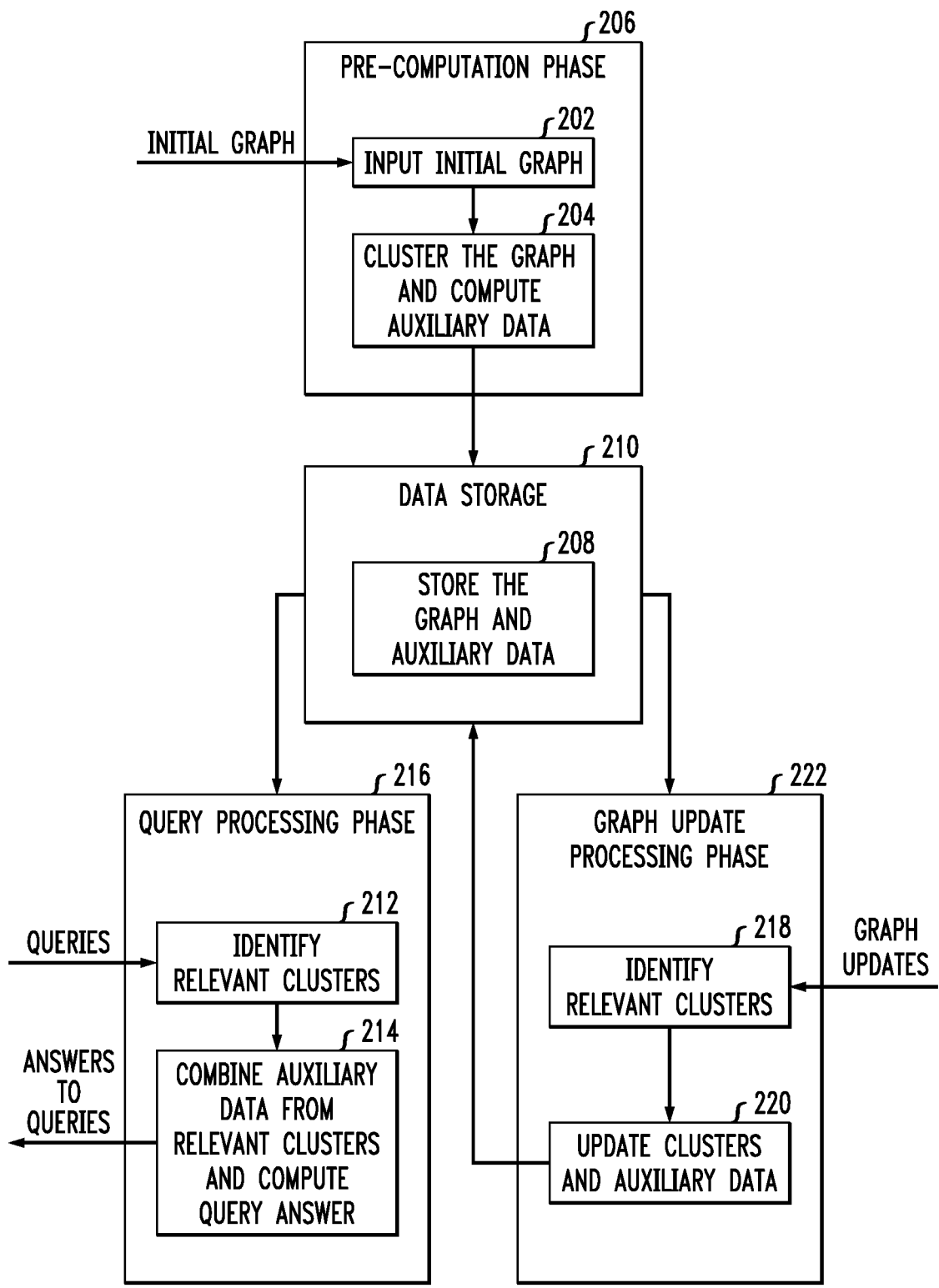
FIG. 2 is a flow diagram illustrating techniques for processing a random-walk based vertex-proximity query on a graph, according to an embodiment of the invention.

FIG. 2 is a flow diagram illustrating techniques for processing a (large, time-evolving) random-walk based vertex-proximity query on a graph, according to an embodiment of the present invention. Step 206 includes pre-processing, which includes steps 202 and 204. Step 202 includes inputting the initial graph. Step 204 includes computing at least one vertex cluster and corresponding meta-information (auxiliary data) from a graph. These steps can be carried out, for example, using modules 102 and 104 (as illustrated in FIG. 1). The graph can be weighted or unweighted, directed or undirected. Also, computing a vertex cluster and corresponding meta-information from a graph includes storing the vertex cluster and corresponding meta-information.

Computing a vertex cluster and corresponding meta-information from a graph can also include computing and storing two or more vertex clusters in parallel on one or more computes nodes, as well as computing and storing the corresponding meta-information in parallel on one or more computes nodes, wherein the corresponding meta-information includes matrices capturing behavior of intra-cluster random walk mixing for each cluster independently of other clusters. FIG. 2 also includes storing data in step 210, which includes storing the graph and the auxiliary data in step 208.

Step 222 includes dynamically updating the clustering and corresponding meta-information upon modification of the graph, which includes steps 218 and 220. These steps can be carried out, for example, using modules 120, 122 and 124 (as illustrated in FIG. 1). Modification of the graph can include an addition and/or a deletion of an edge, an addition and/or a deletion of a vertex, etc. Step 218 includes identifying relevant clusters to update. Dynamically updating the corresponding meta-information upon modification of the graph can include providing a low-rank update to matrices comprising the corresponding meta-information, as carried out in step 220, as well as updating the vertex clusters, as carried out in step 202.

Step 216 includes identifying a vertex cluster relevant to at least one query vertex and aggregating corresponding meta-information of the cluster to process the query, which includes steps 212 and 214. This step can be carried out, for example, using modules 114, 116 and 118 (as illustrated in FIG. 1). Identifying a vertex cluster relevant to a query vertex and aggregating corresponding meta-information of the relevant cluster to process the query can include a front compute node receiving a nearest neighbor query. Receiving a nearest neighbor query includes receiving type of the query and at least one query vertex. Additionally, identifying a vertex cluster relevant to a query vertex, as carried out in step 212, and aggregating corresponding meta-information of the relevant cluster to process the query, as carried out in step 214, can include identifying a compute node that contains a vertex cluster relevant to the query.

An example embodiment of the invention can also include aggregating at a front compute node meta-information comprising an inter-cluster interaction matrix from the identified compute node, and processing at the front node the aggregated information, as well as communicating output of the processing at the front node to the identified compute node. Further, an embodiment of the invention can include computing a partial score for graph vertices on each of the identified compute nodes, and aggregating the partial score at the front compute node to produce a final result.

The techniques depicted in FIG. 2 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a graph clustering Module, auxiliary data computation Module that does an update of clusters, and a Module that does an update of auxiliary data, that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 3:
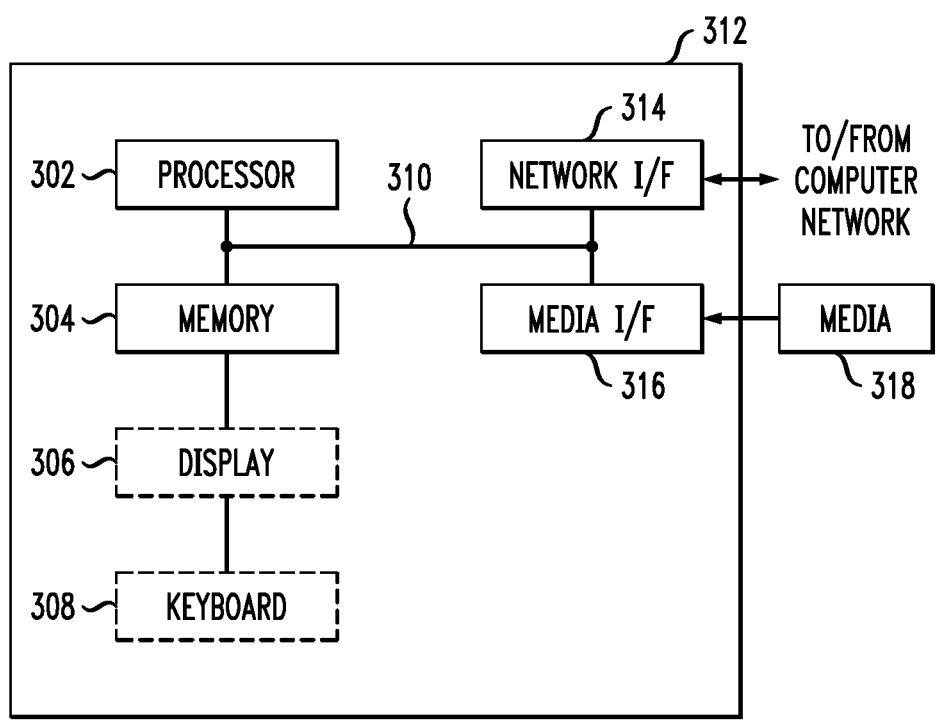
FIG. 3 is a system diagram of an exemplary computer system on which at least one embodiment of the invention can be implemented.

Additionally, an aspect of the present invention can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable to combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, using clustering to compute meta information a-priori and using that information to compute personalized page-rank values at query time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing a random-walk based vertex-proximity query on a graph, wherein the method comprises:

dividing a graph of vertices into multiple clusters that are each estimated to contain a random walk for a duration of time, wherein said dividing comprises dividing the graph of vertices into multiple clusters based on a conductance value computed for each of the multiple clusters, and wherein the conductance value for each of the multiple clusters is defined as $$\phi(S) = \frac{|\partial(S)|}{\min\{VOL(S), VOL(\overline{S})\}} \in [0, 1], \text{ wherein } VOL(S) = \sum_{v \in S} d_v$$

wherein $d_v$ denotes the degree of vertex v and $\partial(s)$ denotes the set of edges with exactly one end-point in cluster S;

computing meta-information for each of the multiple clusters, wherein the meta-information is related to the random walk inside each of the multiple clusters from the graph;

dynamically updating the multiple clusters and corresponding meta-information upon modification of the graph;

identifying a subset of one or more clusters from the multiple updated clusters that are relevant to a query vertex; and processing a nearest-neighbor query on the subset of one or more identified clusters by:
pre-computing an intra-cluster random walk for each of the multiple clusters prior to the nearest-neighbor query;
identifying the pre-computed intra-cluster random walk for each cluster in the subset of one or more identified clusters subsequent to the nearest-neighbor query; and
computing a stationary distribution of an inter-cluster random walk across the subset of one or more identified clusters starting from the query vertex subsequent to the nearest-neighbor query, wherein said computing the stationary distribution of the inter-cluster random walk comprises combining the computed intra-cluster random walk for each cluster in the subset of one or more identified clusters;

wherein at least one of the steps is carried out by a computer device.

2. The method of claim 1, wherein computing meta-information further comprises storing the at least one vertex cluster and corresponding meta-information from a graph.

3. The method of claim 1, wherein modification of the graph comprises at least one of an addition and a deletion of an edge.

4. The method of claim 1, wherein modification of the graph comprises at least one of an addition and a deletion of a vertex.

5. The method of claim 1, wherein the graph is weighted.

6. The method of claim 1, wherein the graph is unweighted.

7. The method of claim 1, wherein the graph is directed.

8. The method of claim 1, wherein the graph is undirected.

9. The method of claim 1, wherein computing meta-information further comprises computing and storing two or more vertex clusters in parallel on one or more computes nodes.

10. The method of claim 1, wherein computing meta-information further comprises computing and storing the corresponding meta-information in parallel on one or more computes nodes, and wherein the corresponding meta-information comprises matrices capturing behavior of intra-cluster random walk mixing for each cluster independently of other clusters.

11. The method of claim 1, wherein dynamically updating the corresponding meta-information upon modification of the graph comprises providing at least one low-rank update to one or more matrices comprising the corresponding meta-information.

12. The method of claim 1, wherein dynamically updating the corresponding meta-information upon modification of the graph comprises recomputing the at least one vertex cluster.

13. The method of claim 1, wherein identifying a subset of one or more clusters from the multiple updated clusters that are relevant to a query vertex comprises a front compute node receiving a nearest neighbor query.

14. The method of claim 13, wherein receiving a nearest neighbor query comprises receiving type of the query and at least one query vertex.

15. The method of claim 1, wherein identifying a subset of one or more clusters from the multiple updated clusters that are relevant to a query vertex comprises identifying at least one compute node that contains a vertex cluster relevant to the query.

16. The method of claim 15, further comprising:
aggregating at a front compute node meta-information comprising an inter-cluster interaction matrix from the at least one identified compute node, and processing at the front node the aggregated information; and
communicating output of the processing at the front node to the at least one identified compute node.

17. The method of claim 15, further comprising:
computing a partial score for graph vertices on each of the identified compute nodes.

18. The method of claim 17, further comprising:
aggregating the partial score at the front compute node to produce a final result.

19. An article of manufacture comprising a computer readable storage device having computer readable instructions tangibly embodied thereon which, when implemented, cause a computer to carry out a plurality of method steps comprising:

dividing a graph of vertices into multiple clusters that are each estimated to contain a random walk for a duration of time, wherein said dividing comprises dividing the graph of vertices into multiple clusters based on a conductance value computed for each of the multiple clusters, and wherein the conductance value for each of the multiple clusters is defined as $$\phi(S) = \frac{|\partial(S)|}{\min\{VOL(S), VOL(\overline{S})\}} \in [0, 1], \text{ wherein } VOL(S) = \sum_{v \in S} d_v$$

wherein $d_v$ denotes the degree of vertex v and $\partial(s)$ denotes the set of edges with exactly one end-point in cluster S;

computing meta-information for each of the multiple clusters, wherein the meta-information is related to the random walk inside each of the multiple clusters from the graph;

dynamically updating the multiple clusters and corresponding meta-information upon modification of the graph;

identifying a subset of one or more clusters from the multiple updated clusters that are relevant to a query vertex; and processing a nearest-neighbor query on the subset of one or more identified clusters by:
pre-computing an intra-cluster random walk for each of the multiple clusters prior to the nearest-neighbor query;
identifying the pre-computed intra-cluster random walk for each cluster in the subset of one or more identified clusters subsequent to the nearest-neighbor query; and
computing a stationary distribution of an inter-cluster random walk across the subset of one or more identified clusters starting from the query vertex subsequent to the nearest-neighbor query, wherein said computing the stationary distribution of the inter-cluster random walk comprises combining the computed intra-cluster random walk for each cluster in the subset of one or more identified clusters.

20. A system for processing a random-walk based vertex-proximity query on a graph, comprising:

at least one distinct software module, each distinct software module being embodied on a tangible computer-readable medium;

a memory; and at least one processor coupled to the memory and operative for:

dividing a graph of vertices into multiple clusters that are each estimated to contain a random walk for a duration of time, wherein said dividing comprises dividing the graph of vertices into multiple clusters based on a conductance value computed for each of the multiple clusters, and wherein the conductance value for each of the multiple clusters is defined as $$\phi(S) = \frac{|\partial(S)|}{\min\{VOL(S), VOL(\overline{S})\}} \in [0, 1], \text{ wherein } VOL(S) = \sum_{v \in S} d_v$$

wherein $VOL(S) = \Sigma_{v \in S} d^v$ wherein $d_v$ denotes the degree of vertex v and $\partial(s)$ denotes the set of edges with exactly one end-point in cluster S;

computing meta-information for each of the multiple clusters, wherein the meta-information is related to the random walk inside each of the multiple clusters from the graph;

dynamically updating the multiple clusters and corresponding meta-information upon modification of the graph;

identifying a subset of one or more clusters from the multiple updated clusters that are relevant to a query vertex; and processing a nearest-neighbor query on the subset of one or more identified clusters by:

pre-computing an intra-cluster random walk for each of the multiple clusters prior to the nearest-neighbor query;

identifying the pre-computed intra-cluster random walk for each cluster in the subset of one or more identified clusters subsequent to the nearest-neighbor query; and computing a stationary distribution of an inter-cluster random walk across the subset of one or more identified clusters starting from the query vertex subsequent to the nearest-neighbor query, wherein said computing the stationary distribution of the inter-cluster random walk comprises combining the computed intra-cluster random walk for each cluster in the subset of one or more identified clusters.

* * * * *